United States Patent

Numazawa et al.

[11] 4,220,072
[45] Sep. 2, 1980

[54] POWER STEERING APPARATUS

[75] Inventors: Akio Numazawa, Nagoya; Minoru Kawabata, Aichi; Ryutaro Abe, Toyokawa; Mikio Suzuki, Hekinan; Yoshiharu Inaguma, Nagoya, all of Japan

[73] Assignees: Toyoda Koki Kabushiki Kaisha; Toyota Jidosha Kogyo Kabushiki Kaisha, both of Aichi, Japan

[21] Appl. No.: 933,873

[22] Filed: Aug. 15, 1978

[30] Foreign Application Priority Data

Sep. 6, 1977 [JP] Japan .................. 52-119753[U]

[51] Int. Cl.² .............................................. F15B 9/10
[52] U.S. Cl. .............................. 91/375 A; 137/625.21
[58] Field of Search .............. 91/375 A, 375 R, 370, 91/371, 372, 373

[56] References Cited
U.S. PATENT DOCUMENTS 3,408,900  11/1968  Tomita .................. 91/375 A
3,657,967  4/1972  Suzuki .................. 91/372
3,817,151  6/1974  Kawabata et al. .......... 91/375 A
4,048,904  9/1977  Kawabata et al. .......... 91/372

Primary Examiner—Paul E. Maslousky
Attorney, Agent, or Firm—Oblon, Fisher, Spivak, McClelland & Maier

[57] ABSTRACT

A power steering apparatus comprises a main valve member rotating in response to the action of a fluid pressure motor supplementing manual steering torque and a flap valve member rotating in response to the manual steering torque and mounted within the main valve member. The main valve member and the flap valve member are operable to control flow of fluid under pressure supplied into and discharged from the fluid pressure motor. A plunger member is slidably received in the flap valve member and is provided with an anti-vibration member. A passage communicating with a fluid supply port is provided for applying fluid under pressure to the plunger member to urge the anti-vibration member against the main valve member.

9 Claims, 4 Drawing Figures

POWER STEERING APPARATUS

BACKGROUND OF THE INVENTION

1. Field of the Invention

The present invention relates to a power steering apparatus provided with a flap valve mechanism for controlling fluid under pressure supplied into a fluid pressure motor supplementing manual steering torque.

2. Description of the Prior Art

A power steering apparatus with a servo valve device of a flap valve mechanism has, in general, high sensitivity so that small rotational displacement of the flap valve can rapidly and precisely deflect the steered wheels. However, since sensitivity of the flap valve mechanism is so high that fluid pressure in a hydraulic circuit is abruptly changed in response to the operation of the flap valve, vibration is generated on the flap valve. Accordingly, this vibration creates an unpleasant sensation to the operator and the fluid control for the servo valve device becomes unstable.

In order to prevent such vibration of the flap valves, an attempt has been made, wherein a pair of plungers are slidably received in a main valve member in a direction parallel to the rotational axis of the main valve member and pressure fluid is supplied between the pair of plungers to urge the same against the sides of the flap valves. This attempt has been somewhat satisfactory but has not been complete.

SUMMARY OF THE INVENTION

It is therefore an object of the present invention to provide a new and improved power steering apparatus wherein vibration of the servo valve device thereof is effectively prevented.

Another object of the present invention is to provide a new and improved power steering apparatus wherein plunger means is slidably received in the flap valve means and provided with an anti-vibration member, and fluid under pressure is applied to urge the anti-vibration member against the main valve member.

A further object of the present invention is to provide a new and improved power steering apparatus of the character set forth above, wherein spring means is also provided to urge the anti-vibration member against the main valve member.

A still further object of the present invention is to provide a new and improved power steering apparatus of the character set forth above, wherein the plunger means is provided with an oil groove on the periphery thereof to form oil film between the periphery of the plunger means and the flap valve means.

Briefly, according to the present invention, these and other objects are achieved by providing a power steering apparatus, as mentioned below. A housing has a supply port for introducing pressure fluid into the power steering apparatus and a discharge port for discharging fluid therefrom. A fluid pressure motor supplements manual steering torque. A first rotatable steering rod member rotates in response to the action of the fluid pressure motor. A manually rotatable second steering rod member is aligned with the first steering rod member. Resilient means resiliently connects the first and second steering rod members to allow relative rotation therebetween. A main valve member is fixedly connected to the first steering rod member and rotatably mounted in the housing. Flap valve means is mounted on the second steering rod member within the main valve member and extends radially of the second steering rod member. The main valve member and the flap valve means are operable to control flow of fluid under pressure supplied into and discharged from the fluid pressure motor when relatively rotated by the manual steering torque. Plunger means is slidably received in the flap valve means for sliding movement in a direction radially of the second steering rod member. An anti-vibration member is provided on the plunger means. Passage means communicating with the supply port applies fluid under pressure to the plunger means to urge the anti-vibration member against the main valve member.

BRIEF DESCRIPTION OF THE DRAWINGS

The foregoing and other objects and many of the attendant advantages of the present invention will be readily appreciated as the same becomes better understood by reference to the following detailed description, when considered in connection with the accompanying drawings, in which.

DETAILED DESCRIPTION OF THE PREFERRED EMBODIMENT

Figure 1:
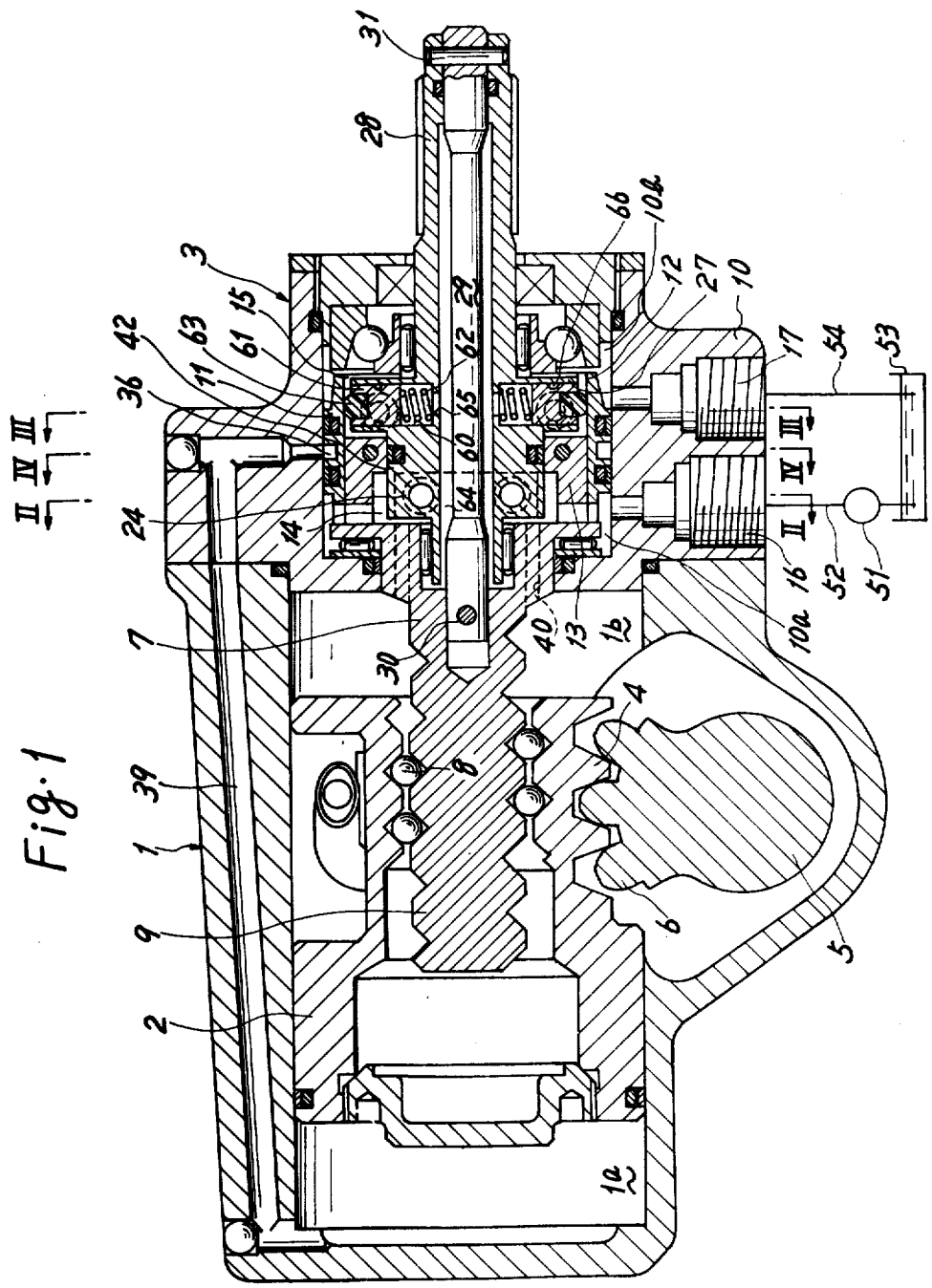
FIG. 1 is a longitudinal sectional view of a power steering apparatus according to the present invention.

Referring now to the drawings, wherein like reference numerals or characters refer to identical or corresponding parts throughout the several views, and more particularly to FIG. 1, there is shown a power steering apparatus according to the present invention. The power steering apparatus is provided with, at one side, a fluid pressure cylinder 1 slidably containing a piston 2 for supplementing manual steering torque and, at the other side, a valve housing 10 rotatably containing a servo valve device 3 for controlling fluid under pressure supplied to the fluid pressure cylinder 1. Fluid chambers 1a and 1b are formed within the cylinder 1 on opposite sides of the piston 2. A rack 4 formed on a part of the periphery of the piston 2 is meshed with a sector gear 6 on a cross shaft 5 which, in turn, is connected through a link mechanism (not shown) to steered wheels of a vehicle. Rotatably and fluid-tightly supported by the valve housing 10, is a first rotatable steering rod 7, which is formed at its one end with a screw shaft 9 threadedly engaged with the piston 2 through balls 8 and at its other end with a main valve means including a main valve member 12 housed in the valve housing 10.

Figure 2:
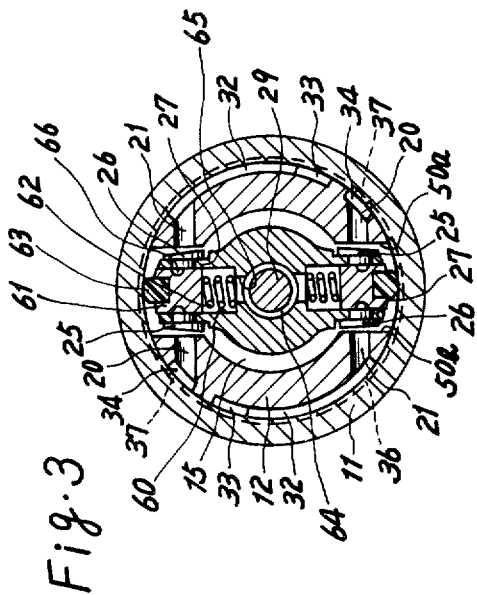
FIG. 2 is a sectional view of the apparatus taken along the line II—II of FIG. 1.
Figure 3:
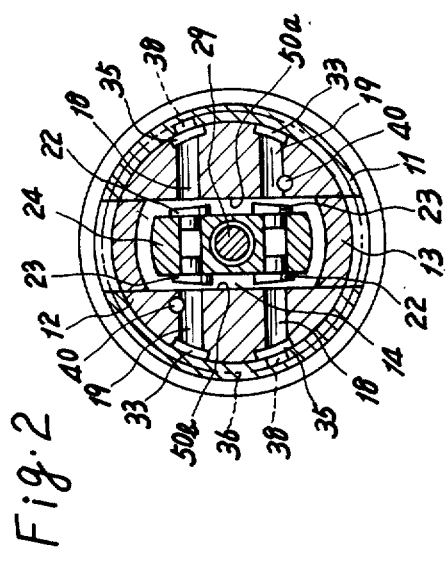
FIG. 3 is a sectional view of the apparatus taken along the line III—III of FIG. 1.
Figure 4:
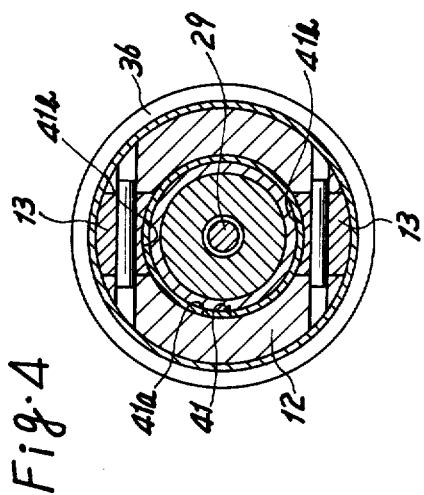
FIG. 4 is a sectional view of the apparatus taken along the line IV—IV of FIG. 1.

The main valve member 12 has formed at a plane containing a rotational axis thereof, an axial slot having a pair of opposed parallel walls 50a and 50b as is shown best in FIGS. 2 and 3. The slot is fluid-tightly partitioned into a first valve chamber 14 and a second valve chamber 15 axially spaced by a pair of partition members 13 tightly housed therein. The main valve means also includes a sleeve valve member 11 in which the main valve member 12 is tightly fitted. The sleeve valve member 11 is rotatably fitted within the valve housing 10 for fluid-tightly partitioning the valve housing 10 into a first housing chamber 10a communicating with the first valve chamber 14 and a second housing chamber 10b communicating with the second valve chamber 15. The first housing chamber 10a communicates with an inlet port 16 connected with the delivery of a fluid pressure pump 51 through a supply pipe 52 so as to be supplied with fluid under pressure. The second housing chamber 10b communicates with an outlet port 17 connected to a reservoir 53 by an exhaust pipe 54 so as to return fluid to the reservoir 53. Moreover, the main valve member 12 has formed at the rotational axis thereof an inner bore 41a which cooperates with inner circular arc surfaces 41b of the partition members 13 to define a perfect circular bore 41 as is best shown in FIG. 4.

A manually rotatable second steering rod 28 which is rotatably and fluid-tightly supported by the valve housing 10 is disposed to align with the first steering rod 7 and extends in the opposite direction thereto. One end of the second steering rod 28 extends out of the valve housing 10 and connects through suitable coupling members with a steering handle or wheel (not shown) so as to be rotated or turned by the driver or operator of the vehicle. The other end of the second steering rod 28 extends into the main valve member 12 and is resiliently connected to the first steering rod 7 by means of a torsion bar 29 which is fixed at its opposite ends to the first and second steering rods 7 and 28 at the rotational axis thereof by pins 30 and 31 respectively.

The second steering rod 28 has integrally formed therewith a cylindrical portion 42 which is rotatably and fluid-tightly fitted to the circular bore 41 so as to prevent communication of fluid under pressure between the valve chambers 14 and 15.

Moreover, the second steering rod 28 has on both sides of the cylindrical portion 42 and integrally formed therewith, first and second flap valve members 24 and 27. These are respectively located in the first and second valve chambers 14 and 15, and extend in the same radial direction with the same thickness so as to be positioned at a central position between the walls 50a and 50b of the valve chambers under a normal or neutral condition of the torsion bar 29.

The radius of the first flap valve member 24 is less than that of the second flap valve member 27 so as to produce a proper steering reaction upon operation of the power steering apparatus, as will hereinafter be made apparent.

The first flap valve member 24 is provided with two pairs of projecting valve seats 22 and 23 on the opposite sides of both ends thereof, so that predetermined equal gaps are respectively maintained between each of the valve seats 22 and 23 and each of the walls 50a and 50b of the first valve chamber 14 under the normal condition of the torsion bar 29. The second flap valve member 27 is provided with two pairs of projecting valve seats 25 and 26 on the opposite sides of both ends thereof so that predetermined equal gaps are respectively maintained between each of the valve seats 25 and 26 and each of the walls 50b and 50a of the second valve chamber 15 under the normal condition of the torsion bar 29. As shown best in FIG. 2, two pairs of first and second distribution ports 18 and 19, which are formed in the main valve member 12, are respectively opened opposite two pairs of valve seats 22 and 23 at both side walls 50a and 50b in the first valve chamber 14. As shown best in FIG. 3, two pairs of first and second injection ports 20 and 21, which are formed in the main valve member 12, are respectively provided opposite two pairs of valve seats 25 and 26 at both side walls 50a and 50b in the second valve chamber 15.

As best shown in FIG. 3, the second flap valve member 27 is provided with two radial bores 60 on opposite ends thereof so as to slidably receive a pair of plungers 61 therein. A compression spring 62 is interposed between the inner end of each plunger 61 and the bottom of each bore 60 so as to urge the plunger 61 outwardly of the second flap valve member 27. Moreover, each of the plungers 61 is provided at its outward end with an anti-vibration member 63 engageable with the inner cylindrical surface of the sleeve valve member 11. The anti-vibration member 63 is made of synthetic resin, such as polyacetal resin or synthetic rubber, such as urethane rubber, with good thermal resistance and wear proof resistance. Each radial bore 60 communicates with the first valve chamber 14 through fluid passages 64 and 65 formed in the second steering rod 28, so that the plunger 61 and the anti-vibration member 63 are also urged toward the inner surface of the sleeve member 11 by fluid under pressure. An oil groove 66 is provided on the periphery of each plunger 61 to form an oil film between the periphery of the plunger 61 and the radial bore 60.

The fluid passage communication of the servo valve device 3 with the fluid pressure cylinder 1 is as follows: As shown best in FIGS. 2 and 3, in the periphery of the main valve member 12 tightly fitted into the sleeve valve member 11 there is formed a pair of arcuate recesses 32 respectively communicating with the pair of second injection ports 21. A pair of axial recesses 33 respectively communicate the arcuate recesses 32 with the pair of second distribution ports 19. A pair of axial recesses 34 respectively communicate with the pair of first injection ports 20. In the periphery of the sleeve valve member 11, there is formed an annular recess 36 communicating with the axial recesses 34 respectively through fluid passages 37. A pair of recesses 35 respectively communicate the pair of first distribution ports 18 with the annular recess 36 through fluid passages 38. The annular recess 36 is communicated with the fluid chamber 1a of the fluid pressure cylinder 1 through a longitudinal passage 39 formed in the valve housing 10 and fluid pressure cylinder 1. On the other hand, the pair of second distribution ports 19 are respectively communicated with the fluid chamber 1b of the fluid pressure cylinder 1 through fluid passages 40 formed in the main valve member 12 or first steering rod 7, as shown in FIGS. 1 and 2.

The operation of a preferred embodiment is hereinafter described. When the steering handle or the second steering rod 28 is positioned at its neutral position, the first and second flap valve members 24 and 27 are both positioned in a central plane of the first and second valve chambers 14 and 15 as shown in FIGS. 2 and 3, so that the flow resistance at each of the distribution ports 18 and 19 and also the injection ports 20 and 21, is equal. Accordingly, fluid under pressure in the first valve chamber 14 supplied from the inlet port 16 is distributed equally into each of the distribution ports 18 and 19 and is discharged from the injection ports 20 and 21 to the second valve chamber 15 and, in turn, the outlet port 17, and fluid pressure produced in each of the fluid chambers 1a and 1b of the fluid pressure cylinder 1 is equally balanced, whereby the piston 2 remains unmoved.

When the second steering rod 28 is turned clockwise, as viewed in FIG. 2, the torsion bar 29 is twisted because of the resistance force between the steered wheels and the road which acts on the first steering rod 7, whereby the second steering rod 28 is turned in a clockwise direction relative to the first steering rod 7, namely, the main valve member 12. Accordingly, the first and second flap valve members 24 and 27 are turned clockwise relative to the first and second valve chambers 14 and 15, as viewed in FIGS. 2 and 3, so that the pair of first distribution ports 18 and the second injection ports 21 tend to be simultaneously closed by the valve seats 22 and 26 and the pair of second distribution ports 19 and the first injection ports 20 tend to be completely opened by the valve seats 23 and 25. Therefore, the greater part of the fluid under pressure in the first valve chamber 14 supplied from the inlet port 16 is distributed to the pair of second distribution ports 19, and is mostly supplied to the right fluid chamber 1b of the fluid pressure cylinder 1 through the fluid passages 40. This is because the fluid stream to be discharged from the second injection ports 21 to the second valve chamber 15 is now restricted by the valve seats 26. Accordingly, the fluid pressure in the right fluid chamber 1b of the fluid pressure cylinder 1 is increased so that the piston 2 is displaced leftward to effect a right turn of the steered wheels. On the other hand, the fluid stream to be exhausted from the left fluid chamber 1a of the fluid pressure cylinder 1 is led to the second valve chamber 15 through the first injection ports 20 in opened position.

Thus, a small steering torque applied by the operator is amplified owing to the fluid pressure cylinder 1, whereby the operator can easily and lightly deflect the steered wheels to the right. In this operation, the fluid pressure in the right fluid chamber 1b of the fluid pressure cylinder 1 acts, on the one hand, on the valve seats 26 through the second injection ports 21 to turn the second flap valve member 27 counterclockwise and, on the other hand, on the valve seats 23 through the second distribution ports 19 to turn the first flap valve member 24 clockwise. Consequently, a counterclockwise moment of force under the differential radius between the first and second flap valve members 24 and 27 is produced on the second steering rod 28 as a steering reaction which acts to turn the second steering rod 28 in a direction opposite to the steering torque by the operator. Accordingly, the operator can feel the steering reaction in response to a deflected angle of the steered wheels.

When the first and second flap valve members 24 and 27 are turned clockwise relative to the first and second valve chambers 14 and 15 owing to the clockwise rotation of the steering wheel, fluid pressure is changed abruptly so that vibration tends to be generated on the first and second flap valve members 24 and 27. However, since the fluid under pressure being increased in the first valve chamber 14 is applied through the fluid passages 64 and 65 into the radial bores 60 to urge the plungers 61 outwardly of the second flap valve member 27, the anti-vibration members 63 are more tightly but still slidably abutted against the inner cylindrical surface of the sleeve valve member 11 in addition to the force of the compression springs 62. Accordingly, the second flap valve member 27 is firmly engaged with the sleeve valve member 11 to prevent vibration from being generated. Since the anti-vibration members 63 are made of synthetic resin or synthetic rubber, a smooth sliding movement is effected between the anti-vibration members 63 and the inner surface of the sleeve valve member 11 to absorb minute vibration. Furthermore, since the plungers 61 are received in the radial bores 60 through oil film, minute vibration is also absorbed by damping effect.

When the steering wheel is returned to its neutral position, the first and second flap valve members 24 and 27 open the first distribution ports 18 and the second injection ports 21 to decrease the fluid pressure in the first valve chamber 14. Accordingly, the plungers 61 are urged outwardly only by the force of the springs 62 and the friction force between the anti-vibration members 63 and the inner surface of the sleeve valve member 11 is decreased to allow smooth returning of the steering wheel to its neutral position.

When the second steering rod 28 is conversely turned counterclockwise, as viewed in FIG. 2, the second steering rod 28 is turned in a counterclockwise direction relative to the first steering rod 7, and the pair of second distribution ports 19 and the pair of first injection ports 20 tend to be simultaneously closed by the valve seats 23 and 25, and the pair of first distribution ports 18 and the pair of second injection ports 21 tend to be completely opened by the valve seats 22 and 26. Therefore, the fluid pressure cylinder 1 is activated to effect a left turn of the steered wheels. Such operation of the apparatus can be easily deduced from the operation hereinbefore explained and no further explanation thereof is necessary or appropriate.

Many modifications and variations of the present invention are possible in the light of these teachings. It is therefore to be understood that the invention may be practiced otherwise than as specifically described herein within the scope of the appended claims.

What is claimed is:

1. A power steering apparatus comprising:
   a housing having a supply port for introducing pressure fluid into said power steering apparatus and a discharge port for discharging fluid therefrom;
   a fluid pressure motor for supplementing manual steering torque;
   a first rotatable steering rod member rotating in response to the action of said fluid pressure motor;
   a manually rotatable second steering rod member aligned with said first steering rod member;
   resilient means for resiliently connecting said first and second steering rod members to allow relative rotation therebetween;
   a main valve member fixedly connected to said first steering rod member;
   a sleeve valve member tightly receiving said main valve member and rotatably mounted in said housing;
   flap valve means mounted on said second steering rod member within said main valve member and extending radially of said second steering rod member, said main valve member and said flap valve means being operable to control flow of fluid under pressure supplied into and discharged from said fluid pressure motor when relatively rotated by the manual steering torque;
   plunger means slidably received in said flap valve means for a sliding movement in a direction radially of said second steering rod member;
   an anti-vibration member made of synthetic resin and provided on said plunger means; and
   passage means communicating with said supply port for applying fluid under pressure to said plunger means to urge said anti-vibration member against said sleeve valve member.

2. A power steering apparatus as set forth in claim 1, wherein said anti-vibration member is made of polyacetal resin.

3. A power steering apparatus comprising:
- a housing having a supply port for introducing pressure fluid into said power steering apparatus and a discharge port for discharging fluid therefrom;
- a fluid pressure motor for supplementing manual steering torque;
- a first rotatable steering rod member rotating in response to the action of said fluid pressure motor;
- a manually rotatable second steering rod member aligned with said first steering rod member;
- resilient means resiliently connecting said first and second steering rod members to allow relative rotation therebetween;
- a main valve member fixedly connected to said first steering rod member;
- a sleeve valve member tightly receiving said main valve member and rotatably mounted in said housing;
- flap valve means mounted on said second steering rod member within said main valve member and extending radially of said second steering rod member, said main valve member and said flap valve means being operable to control flow of fluid under pressure supplied into and discharged from said fluid pressure motor when relatively rotated by the manual steering torque; and
- anti-vibration means for preventing vibration of said flap valve means, including plunger means slidably received in said flap valve means for a sliding movement in a direction radially of said second steering rod member into frictional engagement with said sleeve valve member, and
- passage means communicating with said supply port for applying fluid under pressure to said plunger means to urge said plunger means against said sleeve valve member.

4. A power steering apparatus as set forth in claim 3, wherein said anti-vibration means is made of synthetic resin.

5. A power steering apparatus comprising:
- a housing having a supply port for introducing pressure fluid into said power steering apparatus and a discharge port for discharging fluid therefrom;
- a fluid pressure motor for supplementing manual steering torque;
- a first rotatable steering rod member rotating in response to the action of said fluid pressure motor;
- a manually rotatable second steering rod member aligned with said first steering rod member;
- resilient means for resiliently connecting said first and second steering rod members to allow relative rotation therebetween;
- a main valve means fixedly connected to said first steering rod member;
- flap valve means mounted on said second steering rod member within said main valve means and extending radially of said second steering rod member, said main valve means and said flap valve means being operable to control flow of fluid under pressure supplied into and discharged from said fluid pressure motor when relatively rotated by the manual steering torque;
- anti-vibration plunger means slidably received in said flap valve means for a sliding movement in a direction radially of said second steering rod member into frictional engagement with said main valve means; and
- passage means communicating with said supply port for applying fluid under pressure to said plunger means to urge said plunger means against said main valve means.

6. A power steering apparatus comprising:
- a housing having a supply port for introducing pressure fluid into said power steering apparatus and a discharge port for discharging fluid therefrom;
- a fluid pressure motor for supplementing manual steering torque;
- a first rotatable steering rod member rotating in response to the action of said fluid pressure motor;
- a manually rotatable second steering rod member aligned with said first steering rod member;
- resilient means for resiliently connecting said first and second steering rod members to allow relative rotation therebetween;
- a main valve member fixedly connected to said first steering rod member;
- a sleeve valve member tightly receiving said main valve member and rotatably mounted in said housing;
- flap valve means mounted on said second steering rod member within said main valve member and extending radially of said second steering rod member, said main valve member and said flap valve means being operable to control flow of fluid under pressure supplied into and discharged from said fluid pressure motor when relatively rotated by the manual steering torque;
- plunger means slidably received in said flap valve means for a sliding movement in a direction radially of said second steering rod member;
- an anti-vibration member made of synthetic rubber and provided on said plunger means; and
- passage means communicating with said supply port for applying fluid under pressure to said plunger means to urge said anti-vibration member against said sleeve valve member.

7. A power steering apparatus as set forth in claim 6, wherein said anti-vibration member is made of urethane rubber.

8. A power steering apparatus as set forth in claim 1, 2, 7 or 6, wherein spring means is interposed between said flap valve means and said plunger means for urging said anti-vibration member against said sleeve valve member.

9. A power steering apparatus as set forth in claim 8, wherein said plunger means is provided with an oil groove on the periphery thereof to form oil film between the periphery of said plunger means and said flap valve means.

* * * * *